US011824642B2

(12) United States Patent
Kamal et al.

(10) Patent No.: US 11,824,642 B2
(45) Date of Patent: *Nov. 21, 2023

(54) SYSTEMS AND METHODS FOR PROVISIONING BIOMETRIC IMAGE TEMPLATES TO DEVICES FOR USE IN USER AUTHENTICATION

(71) Applicant: MASTERCARD INTERNATIONAL INCORPORATED, Purchase, NY (US)

(72) Inventors: Ashfaq Kamal, Stamford, CT (US); Sumeet Bhatt, Jericho, NY (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,972

(22) Filed: Jan. 31, 2022

(65) Prior Publication Data

US 2022/0158994 A1 May 19, 2022

Related U.S. Application Data

(63) Continuation of application No. 15/853,648, filed on Dec. 22, 2017, now Pat. No. 11,240,233.

(51) Int. Cl.
*H04L 29/06* (2006.01)
*H04L 9/40* (2022.01)
*G06Q 20/20* (2012.01)

(52) U.S. Cl.
CPC ......... *H04L 63/0861* (2013.01); *G06Q 20/20* (2013.01); *H04L 63/0823* (2013.01); *H04L 63/0853* (2013.01)

(58) Field of Classification Search
CPC ............ H04L 63/0861; H04L 63/0823; H04L 63/0853; G06Q 20/20
See application file for complete search history.

(56) References Cited

U.S. PATENT DOCUMENTS 6,011,858 A 1/2000 Stock et al.
6,311,272 B1 10/2001 Gressel
(Continued)

OTHER PUBLICATIONS

U.S. Appl. No. 15/853,648, filed Dec. 22, 2017, Kamal et al.
(Continued)

*Primary Examiner* — Saleh Najjar
*Assistant Examiner* — Devin E Almeida
(74) *Attorney, Agent, or Firm* — Harness, Dickey & Pierce, P.L.C.

(57) ABSTRACT

Systems and methods are provided for use in provisioning a biometric image template to a card device. One example portable communication device includes a processor, a wireless communication interface coupled to the processor, and an input device coupled to the processor. The processor is configured to transmit to a card device, via the wireless communication interface, a certificate associated with the portable communication device, whereby the portable communication device is authenticated by the card device, receive from the card device, via the wireless communication interface, a certificate associated with the card device, and authenticate the card device based on the received certificate. After the card device is authenticated, the processor is configured to capture, via the at least one input device, a biometric image of the user and provision, via the wireless communication interface, the captured biometric image to the card device.

17 Claims, 2 Drawing Sheets

(56) References Cited

U.S. PATENT DOCUMENTS

| | | |
|---|---|---|
| 6,325,285 B1 | 12/2001 | Baratelli |
| 6,819,219 B1 | 11/2004 | Bolle et al. |
| 7,634,448 B1 | 12/2009 | Ramachandran |
| 9,384,480 B2 | 7/2016 | Jain |
| 10,142,333 B1 | 11/2018 | Griffin et al. |
| 2002/0046336 A1 | 4/2002 | Kon et al. |
| 2002/0120876 A1 | 8/2002 | Pearson et al. |
| 2003/0046542 A1 | 3/2003 | Chen et al. |
| 2004/0044627 A1 | 3/2004 | Russell et al. |
| 2006/0293891 A1* | 12/2006 | Pathuel ............... G06F 21/32 704/E17.003 |
| 2007/0220273 A1 | 9/2007 | Campisi |
| 2008/0028230 A1 | 1/2008 | Shatford |
| 2009/0164797 A1 | 6/2009 | Kramer |
| 2009/0190802 A1 | 7/2009 | Adams et al. |
| 2009/0191846 A1* | 7/2009 | Shi ................ H04L 63/0861 455/411 |
| 2009/0322477 A1 | 12/2009 | Celorio |
| 2010/0085150 A1 | 4/2010 | Aikawa et al. |
| 2012/0254030 A1 | 10/2012 | Khan et al. |
| 2012/0311719 A1 | 12/2012 | Hamann et al. |
| 2012/0313754 A1 | 12/2012 | Bona |
| 2013/0232082 A1 | 9/2013 | Krawczewicz et al. |
| 2013/0318361 A1 | 11/2013 | Erickson et al. |
| 2014/0282945 A1 | 9/2014 | Smith et al. |
| 2014/0317715 A1* | 10/2014 | Conner ............. G06K 19/0718 726/7 |
| 2014/0329497 A1* | 11/2014 | Sanzgiri ........... H04M 1/72412 455/26.1 |
| 2014/0359722 A1 | 12/2014 | Schultz et al. |
| 2015/0127553 A1 | 5/2015 | Sundaram et al. |
| 2015/0149782 A1 | 5/2015 | Thom et al. |
| 2015/0269563 A1 | 9/2015 | He et al. |
| 2015/0312041 A1* | 10/2015 | Choi ................ H04L 63/0861 713/175 |
| 2016/0125223 A1 | 5/2016 | Boshra et al. |
| 2016/0300236 A1 | 10/2016 | Wiley et al. |
| 2016/0381003 A1 | 12/2016 | Caceres et al. |
| 2017/0116614 A1 | 4/2017 | Tanaka |
| 2018/0004924 A1* | 1/2018 | Tieu ................... G06F 21/6218 |
| 2018/0101718 A1 | 4/2018 | Lowe et al. |
| 2018/0174149 A1* | 6/2018 | Goldschmidt ........ G07F 7/1008 |
| 2018/0181739 A1 | 6/2018 | Zhong et al. |
| 2018/0189583 A1 | 7/2018 | Wohlken et al. |
| 2019/0005342 A1* | 1/2019 | Rosqvist ............ G06F 16/2379 |
| 2019/0197815 A1 | 6/2019 | Kamal et al. |
| 2019/0199714 A1 | 6/2019 | Kamal et al. |
| 2019/0220583 A1 | 7/2019 | Douglas et al. |
| 2020/0387906 A1* | 12/2020 | Vondrak ............. G06Q 20/3672 |

OTHER PUBLICATIONS

U.S. Appl. No. 15/853,643, filed Dec. 22, 2017, Kamal et al.
U.S. Appl. No. 15/853,648: (a) Office Action dated Sep. 18, 2019; (b) Office Action dated Apr. 1, 2020; (c) Office Action dated Oct. 19, 2020; (d) Office Action dated Apr. 29, 2021; and (e) Notice of Allowance dated Nov. 8, 2021. The instant application is a continuation of U.S. Appl. No. 15/853,648.
PCT International Search Report and Written Opinion (11 pages) of PCT Patent Application No. PCT/US2018/063182, dated Apr. 10, 2019, which has the same priority claim as the instant application.
U.S. Appl. No. 15/853,643: (a) Office Action dated Apr. 17, 2019; (b) Office Action dated Sep. 19, 2019; and (c) Notice of Allowance dated Jan. 13, 2020. U.S. Appl. No. 15/853,643 has common subject matter as the instant application and the same Applicant, Mastercard International Incorporated.
PCT International Search Report and Written Opinion (8 pages) of PCT Patent Application No. PCT/US2018/059331, dated Mar. 4, 2019. PCT/US2018/059331 has common subject matter as the instant application and the same Applicant, Mastercard International Incorporated.

* cited by examiner

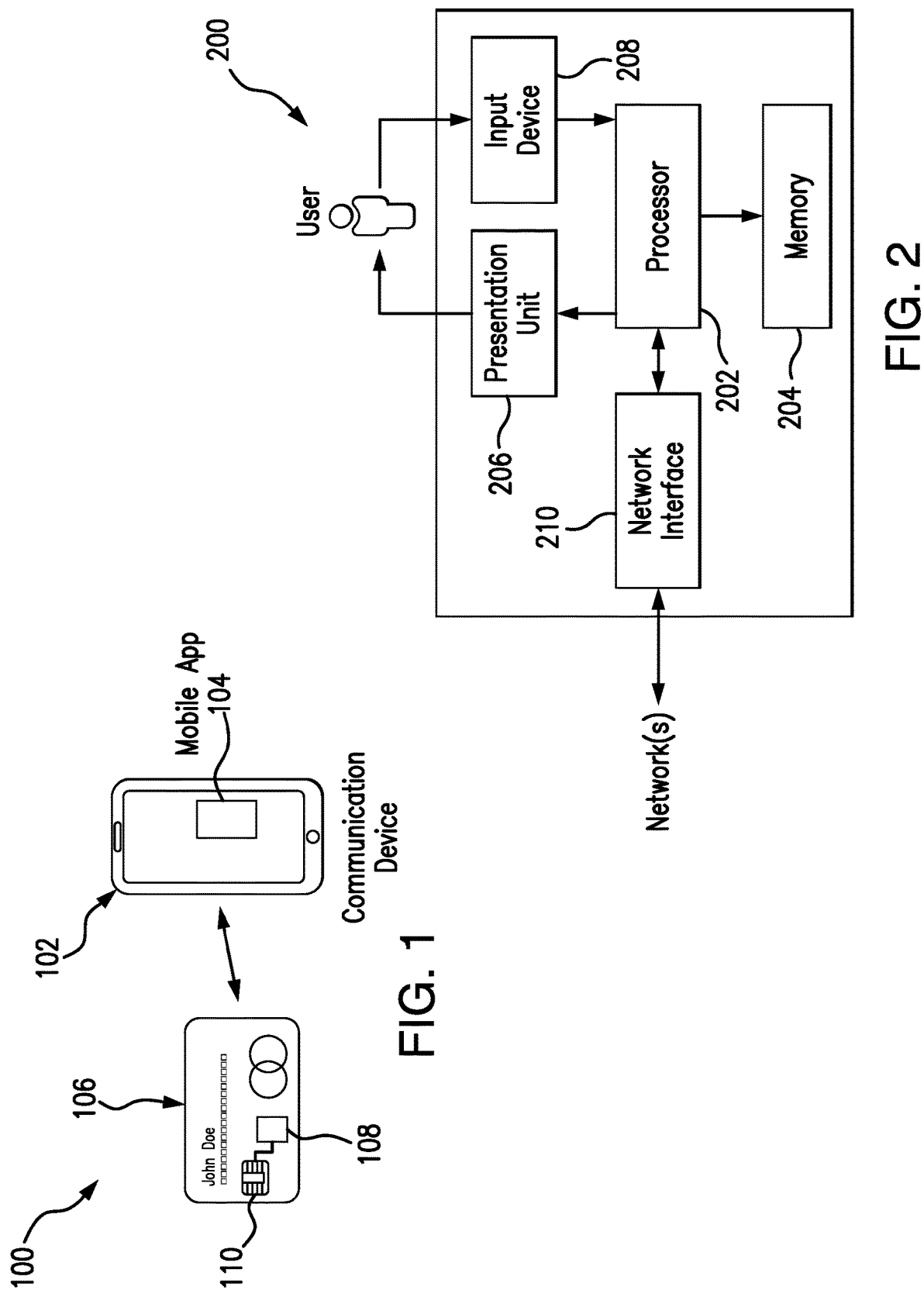

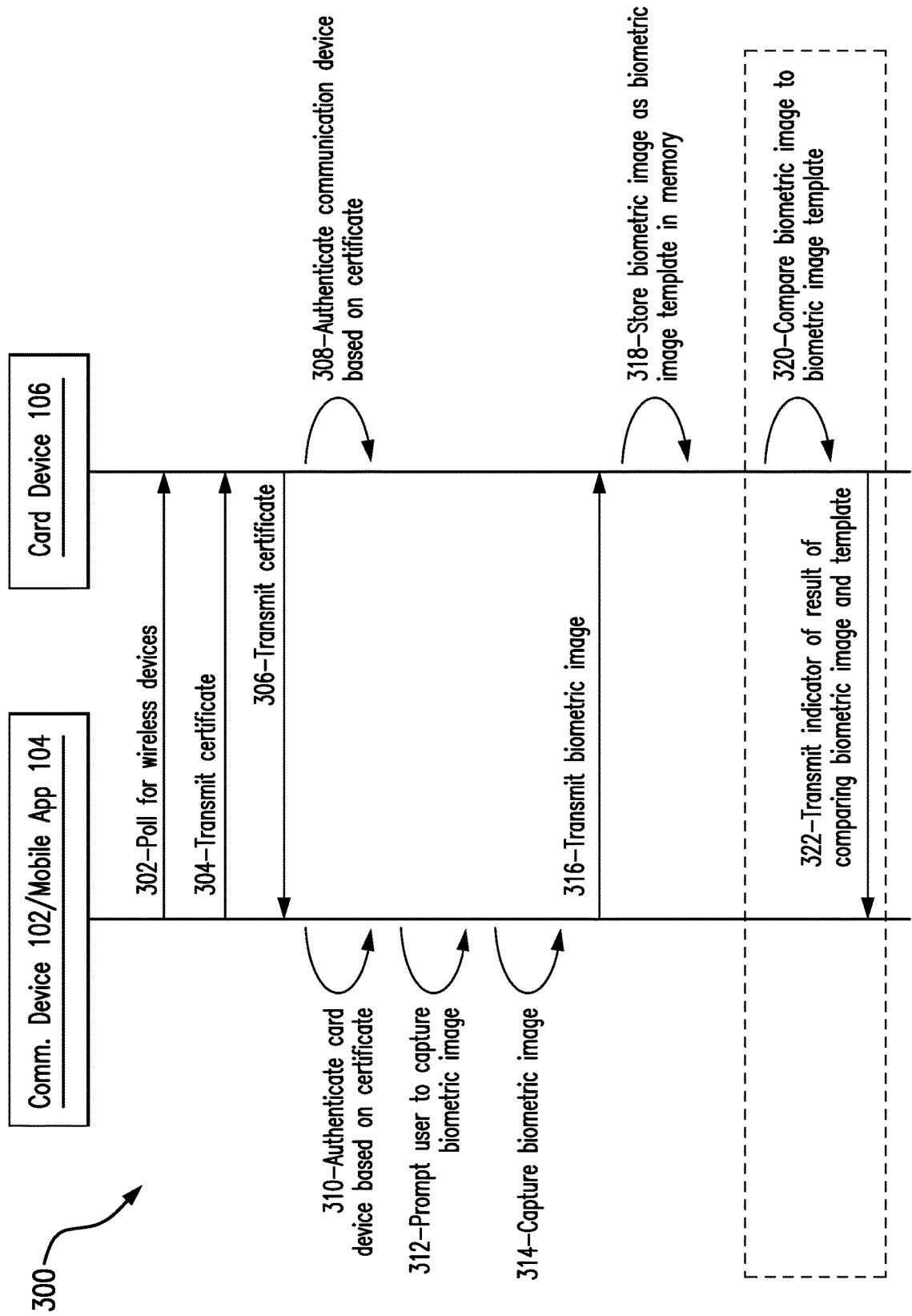

SYSTEMS AND METHODS FOR PROVISIONING BIOMETRIC IMAGE TEMPLATES TO DEVICES FOR USE IN USER AUTHENTICATION

CROSS-REFERENCE TO RELATED APPLICATION

This application is a continuation of U.S. patent application Ser. No. 15/853,648 filed on Dec. 22, 2017. The entire disclosure of the above application is incorporated herein by reference.

FIELD

The present disclosure generally relates to systems and methods for authenticating users and, more particularly, to systems and methods for provisioning user biometric image templates (e.g., facial image templates, etc.) to devices associated with the users, which may then be used in authenticating the users.

BACKGROUND

This section provides background information related to the present disclosure which is not necessarily prior art.

People are known to be associated with a variety of different types of accounts, including email accounts, bank accounts, and payment accounts, to name a few. In connection with opening the accounts, people to be associated with the accounts (broadly, users) may initially need to be identified and verified. For example, when a person opens a banking account with a banking institution, the banking institution typically requires the person to present identification, often in the form of a driver's license or other government issued document, prior to permitting the person to open the account. Such identification process, or "know your customer" (KYC) process, is provided to inhibit the person from fraudulently opening the account, based on, for example, identity theft, or otherwise. More broadly, the identification process aids the banking institution in abiding by applicable rules and/or regulations regarding the accounts issued thereby (e.g., relating to anti-money laundering, anti-corruption, etc.).

DRAWINGS

The drawings described herein are for illustrative purposes only of selected embodiments and not all possible implementations, and are not intended to limit the scope of the present disclosure.

FIG. 1 illustrates an exemplary system of the present disclosure suitable for use in provisioning a biometric image template for a user to a card device associated with the user for subsequent use in authenticating the user;

FIG. 2 is a block diagram of a computing device that may be used in the exemplary system of FIG. 1; and FIG. 3 illustrates a flow diagram of an exemplary method, which may be implemented in connection with the system of FIG. 1, for provisioning a biometric image template to a card device for use in authenticating a user associated with the card device.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

People (broadly, users) are often required to authenticate themselves in connection with a variety of tasks, especially tasks related to payment accounts and corresponding payment account transactions. When a debit card is provided to a person, for example, the person is often required to enter a personal identification number or PIN to authenticate himself/herself to the debit card (and associated account) to be able to use the debit card. More recently, fingerprint biometric readers have been incorporated into payment cards, whereby on-card comparisons of captured fingerprints to reference fingerprints may be used to authenticate people. The provisioning of the reference fingerprints to the payment cards may be onerous, however, on the people associated with the cards and/or on issuers of the payment cards.

Uniquely, the systems and methods herein permit provisioning of biometric image templates to card devices, whereby the card devices may be used to authenticate users associated with the card devices. In particular, a communication device associated with a user generally includes a camera input device, whereby an image biometric of the user may be captured. The communication device, herein, further includes a mobile application, which is associated with a certificate. In use, the communication device, via the mobile application, then provides its certificate to a card device (e.g., a contactless payment card, etc.), and receives a certificate therefrom. After each certificate is authenticated (i.e., one by the card device and one by the communication device), the image biometric, captured at the communication device, is communicated to the card device. In turn, based on the authentication, the card device is able to store the biometric image, as an image template, in memory of the card device for use in authenticating the user in connection with future transactions using the card device and/or with other interactions with the card device. In this manner, the card device may be provisioned with a biometric image template for the user apart from the issuer of the card device, and without loss of security in provisioning the template to the card device.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, particular types of devices employed in the authentication and/or identification processes (e.g., particular types of communication devices, particular types of contactless card devices, etc.), privacy requirements, etc.

The system 100 generally includes a communication device 102 with a mobile application 104 installed thereon, and a card device 106. In particular, the communication device 102 may include, for example, a smartphone, a tablet, a laptop computing device, etc., which is generally a portable communication device. The communication device 102 is associated with a user (not shown) (e.g., a personal device of the user, not a publically available and/or shared device, etc.), who, in turn, is associated with an identity. In general, the identity of the user indicates and/or includes (without limitation) one or more of a name of the user, an address of the user, a birthdate for the user, an appearance and/or image of the user (e.g., a facial image, etc.), a fingerprint of the user, contact information for the user, a social security number or other government identification number for the user, etc.

In the illustrated embodiment, the mobile application 104 installed at the communication device 102 is associated with an issuer (not shown) of the card device 106 (although this is not required in all embodiments), in that the issuer has provided the mobile application 104 with a certificate. In this manner, the mobile application 104 may be verified by the communication device 102, and vice-versa, as described in more detail below. In addition, the mobile application 104 may include and/or be associated with one or more additional applications downloaded to, installed, and/or active in the communication device 102, as desired and/or appropriate.

The card device 106 in the exemplary system 100 includes a payment card device, which is associated with a payment account issued by the issuer. The card device 106 is more specifically a contactless payment card device, whereby it is configured to communicate with a point-of-sale (POS) terminal or other device (e.g., the user's communication device 102, etc.) without having to make specific physical contact therewith (e.g., without the user having to swipe a magnetic strip of the card device 106, without the user inserting the card device 106 into a reader, etc.). In this manner, the card device 106 may be used to initiate a transaction at a merchant (associated with the POS terminal), where the transaction is to be funded by the payment account associated with the card device 106. The particular contactless communication, in this embodiment, includes near field communication (NFC), which provides wireless network communication with the communication device 102 and other devices, for example, without physical interaction(s) therebetween. That said, it should be understood that other types of contactless or wireless communication may be employed for the card device 106 in other embodiments.

In addition in this exemplary embodiment, the card device 106 includes a memory 108 (e.g., as part of and/or associated with a chip 110 of the card device 106 (e.g., as part of and/or associated with an EMV chip, etc.), etc.), whereby data may be stored in the card device 106 by the card device 106 itself, or, potentially, by another device. Further, upon issuance of the card device 106 to the user, or issuance in general, the issuer may provide a certificate to the card device 106, which is then also stored in the memory 108 of the card device 106 for use as described in detail below.

FIG. 2 illustrates an exemplary computing device 200 that can be used in the system 100 of FIG. 1. The computing device 200 may include, for example, one or more servers, workstations, personal computers, laptops, tablets, smartphones, card devices, POS terminals, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, the communication device 102 and the card device 106 associated with user can both be considered computing devices (or as including computing devices) generally consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein. In one example, the processor 202 may include an EMV chip.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, biometrics (e.g., facial images (e.g., selfies, etc.), fingerprints, etc.), biometric references, images, private and/or public keys, public/private key pairs, identity records, certificates, ID data, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein. The memory 108 of the card device 106 is generally consistent with the memory 204 of the computing device 200.

In the exemplary embodiment, the computing device 200 also includes a presentation unit 206 that is coupled to (and that is in communication with) the processor 202 (however, it should be appreciated that the computing device 200 could include output devices other than the presentation unit 206, etc.). The presentation unit 206 outputs information (e.g., prompts to provide biometrics, etc.), visually or audibly, for example, to a user of the computing device 200 (e.g., the user associated with the communication device 102, etc.), etc. And, various interfaces (e.g., as defined by the mobile application 104, or as defined by websites other network-based applications, etc.) (e.g., including instructions to capture biometrics, etc.) may be displayed at computing device 200, and in particular, at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user of the computing device 200 (i.e., user inputs) such as, for example, images of the user and/or biometrics thereof, etc., in response to prompts from the mobile application 104, as further described below. The input device 208 may include a single input device or multiple input devices. The input device 208 is coupled to (and is in communication with) the processor 202 and may include, for example, one or more of a keyboard, a pointing device, a mouse, a stylus, a camera, biometric reader (e.g., fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter (e.g., a radio-frequency identification (RFID) adapter, etc.), a Bluetooth™ adapter, etc.) (e.g., suitable for "contactless communication," etc.), a mobile network adapter, or other device capable of communicating to one or more different ones of the networks used herein. Further, in some exemplary embodiments, the computing device 200 may include at least one processor (e.g., the processor 202, etc.), at least one memory (e.g., the memory 204, etc.), and/or one or more network interfaces (e.g., network interface 210, etc.) included in, or incorporated into or with the at least one processor (e.g., as an embedded card chip (e.g., having an antenna, etc.), etc.). An example of such a computing device includes chip 110 of the card device 106.

Referring again to FIG. 1, when the user desires to provision an image of the user to the card device, for example, for use in subsequent authentication of the user for one or more different reasons, the user initially accesses the mobile application 104, at the communication device 102. In turn, the communication device 102, as configured by the mobile application 104, via the wireless network adaptor (broadly, network interface 210), polls the vicinity of the communication device 102 for any NFC-enabled devices, intermittently and/or for one or more intervals. For example, the communication device 102, as configured by the mobile application 104, via the wireless network adaptor, may poll for NFC devices for ten seconds, fifteen seconds, or more (or less) after an input from the user to detect the card device 106. When the card device 106 is proximate to the communication device 102 (i.e., close enough for an NFC connection in this example), the communication device 102, as configured by the mobile application 104, detects the card device 106 and then provides its certificate to the card device 106. Upon the NFC connection, the card device 106, likewise, is configured to provide its certificate to the communication device 102 (and to the mobile application 104). The exchanged certificates may be, for example and without limitation, X.509 formatted certificates distributed by a public key infrastructure (PKI) (e.g., in association with a payment network such as Mastercard International Incorporated, etc. where the payment network may then be the certificate signing authority), etc. Each of the communication device 102 and the card device 106 then attempts to authenticate the certificate received from the other, for example and without limitation, by validating the signature of received X.509 formatted certificates (based on information already included in the communication device 102 and the card device 106 and/or information included in the received certificate (e.g., certificate(s), key(s), etc.), or information received through a network connection, or otherwise) (e.g., thereby facilitating a mutual "handshake", etc.). For example, a public key included in the received certificate may be extracted by the receiving entity (e.g., the communication device 102, the card device 106, etc.) and used to verify the signature of the certificate. If the certificate authentication fails, a corresponding failure message may be displayed to the user at the communication device 102.

In the meantime (or prior or subsequently) in the system 100, the communication device 102, as configured by the mobile application 104, prompts the user to capture a biometric image of a part of the user, such as, for example, the face of the user, etc. In response, the user directs a camera of the communication device 102 (e.g., input device 208, etc.) toward the appropriate part of the user and provides an input to the communication device 102 to capture the image. In turn, the communication device 102 is configured to capture the biometric image of the user. Then, once the communication device 102 and the card device 106 are mutually authenticated, and the biometric image is captured, the communication device 102, as configured by the mobile application 104, transmits the biometric image to the card device 106. In response, the card device 106 stores the biometric image as a biometric image template in the memory 108 for use in authenticating the user to the card device 106 in connection with subsequent payment account transactions and/or other scenarios where user authentication and/or verification is desired (e.g., account access requests, provisioning tokens and/or digital identities, etc.), etc.

Thereafter, in connection with a transaction or other request for authentication and/or verification of the user, the communication device 102 (or another device) and the card device 106 mutually authenticate one another through an exchange of certificates, as described above, via a wireless connection therebetween (e.g., the NFC connection, etc.). Then, the card device 106 is configured to receive a biometric image of the user (or another person) as part of the authentication for the transaction and to compare the received biometric image to the biometric image template stored in the memory 108 therein. When the biometric image matches the template (e.g., based on comparison via a suitable algorithm and the comparison being within a conventional threshold, etc.), the card device 106 is configured to transmit to the communication device 102 and/or mobile application 104, via the connection with the communication device 102, an indicator of the result of the comparison (e.g., 1=match, 0=no match, etc.), alone or in combination with other data. The indicator and other data may additionally be signed and/or encrypted based on key pairs available to and/or stored within the card device 106 (e.g., based on one or more public-private key pairs, etc.).

While the card device 106 is described above as an NFC enabled device, whereby the card device 106 may communicate with the communication device 102 via NFC communication, it should be appreciated that the card device 106 may be capable of communicating with the communication device 102 in other manners in other embodiments (e.g., via one or more networks, via Bluetooth™ communication, etc.).

FIG. 3 illustrates an exemplary method 300 for use in provisioning a biometric image template to a card device, whereby the biometric image template may subsequently be used to authenticate a user of the card device for one or more reasons. The exemplary method 300 is described as implemented in the communication device 102 and the card device 106 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

When the user desires to provision a biometric image template to the card device 106, for use in subsequent authentication of the user for one or more reasons (as provided herein), the user interacts with the mobile application 104 at his/her communication device 102 to initiate a wireless connection between the communication device 102 and the card device 106. This may include, for example, an input from the user to "connect to card" at the mobile application 104 of the communication device 102, or otherwise. After a connection to the card device 106 is established (e.g., via the network interface 210 of the communication device 102, etc.), the user may interact with the mobile application 104 to select an option to provision the card with his/her biometric image (e.g., via an input to the mobile application 104 to "create biometric template", etc.). It should be appreciated that in other embodiments, the user may first select the option to provision the card device 106 with his/her biometric image (e.g., via the input to the mobile application 104 to "create biometric template", etc.), whereby a connection between the communication device 102 and the card device 106 is thereafter established.

It should also be appreciated that the communication device 102, the mobile application 104, and/or the card device 106 may require the user to authenticate himself/herself thereto before establishing any connection between the communication device 102 and the card device 106, for example, before provisioning the card device 106 with his/her biometric image, or at any other time, etc., to ensure that the user is authorized to add or manipulate data on the card device 106 and/or utilize the mobile application 104 at the communication device 102. For example and without limitation, when the user selects an option to provision the card device 106 with his/her biometric image, the mobile application 104 may prompt the user to place his/her finger on a fingerprint scanner (consistent with input device 208) associated with the communication device 102 and compare a fingerprint scan with a fingerprint image stored in the memory 204 of the communication device 102 (to thereby authenticate the user, or not). If the fingerprint scan matches the stored image (based on conventional matching techniques), the mobile application 104 may authorize communication device 102 to authenticate the user, and thereby allow the user to provision the card device 106 with his/her biometric image (which, as discussed below, may be a different biometric image than that which is already stored in the memory 204, or not), thereby permitting to proceed in method 300.

Then in the method 300, in response to the input from the user to provision the biometric image template to the card device 106 (and/or authentication of the user), the communication device 102 polls, at 302, the vicinity of the communication device 102 for one or more wireless devices (via one or more available communication techniques, etc.). Once the card device 106 is identified, the communication device 102 transmits, at 304, its certificate to the card device 106, and likewise, the card device 106 transmits, at 306, its certificate to the communication device 102. As above, the exchanged certificates may be, for example and without limitation, X.509 formatted certificates distributed by a public key infrastructure (PKI), or other suitable certificates, etc. In turn, the card device 106 authenticates the communication device 102, at 308, based on the received certificate of the communication device 102, and the communication device 102 authenticates the card device 106, at 310, based on the received certificate of the card device 106. Again, such authentication may be performed, for example and without limitation, by each of the communication device 102 and the card device 106 validating the signature of a received X.509 formatted certificate (as described above). Again, if any one of the validations and/or authentications fail, an error message may be displayed at the communication device 102 (e.g., at presentation unit 206, etc.) indicating the same.

Next, when the received certificates are validated (and the communication device 102 and the card device 106 are authenticated), the communication device 102 (and/or mobile application 104) prompts, at 312, the user to capture a biometric image of himself/herself. The prompt may include a direction to the user such as, for example, "Take a Selfie" or "Take a Photo of Yourself," etc., displayed at the presentation unit 206 of the communication device 102. Thereafter, the user positions a camera input device (e.g., consistent with input device 208, etc.) of the communication device 102 to take the requested photograph, or asks another person to do the same. The user (or other person) then provides an input to the communication device 102, whereupon the communication device 102 captures, at 314, the biometric image of the user. While the biometric image of the user may include a facial image or selfie in this example, it should be appreciated that other images of the user may be captured and/or used in other embodiments, for example and without limitation, a driver's license photo, another previously validated image, etc.

In turn, the communication device 102 transmits, at 316, the biometric image to the card device 106, in connection with a request to provision the biometric image as a template to the communication device 102.

In response to receiving the biometric image, and based on the mutual authentication (e.g., "handshake", etc.) above, the card device 106 stores, at 318, the biometric image as a biometric image template (e.g., according to an ISO/IEC 19794 format, etc.) in memory 108 for use in future authentication of the user. It should be appreciated that, in connection with storing the biometric image as a biometric image template in the memory 108, the card device 106 may initially determine whether or not a biometric image template is already stored in the memory 108. Then, when no biometric image template is stored in the memory 108, the card device 106 proceeds to store the received biometric image as a template therein. Alternatively, when a biometric image template is already stored in the memory 108, the card device 106 may notify the communication device 102 of such (and, thus, the user) and, potentially, provide an option to the communication device 102 to instruct the card device 106 to replace the existing biometric image template with the recently captured biometric image (e.g., to delete the existing biometric image template and save the recently captured biometric image as a new biometric image template, etc.). It should also be appreciated that the card device 106 may store multiple biometric image templates in the memory 108 (e.g., for a second user of the card device 106, etc.), similarly provisioned in accordance with 302-318, for example and without limitation, using a second communication device 102 and/or mobile application 104 of the second user. In this case, a biometric image template already stored in the memory 108 may not be replaced. In any case, as described herein, the card device 106 is thereby provisioned with a biometric image template.

Subsequently in the method 300, and optionally (as indicated by the dotted designation in FIG. 3), the user may desire to be authenticated, through use of the biometric image template in the card device 106 (e.g., in connection with performing a transaction using the card device 106, etc.). In one implementation, for example, the communication device 102 (or some other communication device) and the card device 106 may interact as described above, with reference to 302-316. Thereafter, however, rather than storing the biometric image as a template (as at 318), the card device 106 instead compares, at 320, the biometric image received (most recently) from the communication device 102 to the biometric image template that was stored, at 318, in the memory 108 of the card device 106. In another implementation, the user may present the card device 106 to another computing device (e.g., a POS terminal, etc.), which then captures (or otherwise directs the capture of) a biometric image of the user for comparison, at 320, to the biometric image template stored in the memory 108 of the card device 106. In both cases, the comparison will rely on conventionally known algorithm(s) and one or more corresponding thresholds, as, again, is conventional, to determine if a match exists, or not (e.g., via minutiae-based algorithms, etc.). The card device 106 may then generate an indicator, where the indicator is an indicator of the result of the comparison (e.g., match, non-match, etc.), and transmit the indicator (alone or with other data), at 322. The card device 106 may transmit the indicator to any device, system, entity, etc. seeking confirmation that the user is authenticated (e.g., to a POS terminal of a merchant for inclusion in a data element of an authorization request for a transaction by the user at the merchant, etc.), or to the communication device 102 itself, etc.

As an example, where the card device 106 includes a credit card, a POS terminal may require the user to authenticate himself/herself in order to initiate a credit card transaction. To do so, the user may utilize the communication device 102 to interact with the card device 106 as describe above to provide the authentication (e.g., to provide the biometric image where the communication device 102 and the card device 106 repeat operations 302-316 in connection with comparing the biometric image to the biometric template stored in memory 108, etc.). Or, the POS terminal may interact with the card device 106 to facilitate the authentication by directing the user to capture a biometric image at the POS terminal (or via the communication device 102), where the captured biometric image is then transmitted to the card device 106 for comparison to the biometric template (but without performing the mutual "handshake" of operations 304-310). Still further, in this later scenario, the biometric template may instead be transmitted to the POS terminal for performing the comparison.

In another example, the card device 106 may additionally, or alternatively, indicate on a display of the card device 106 (e.g., via an LED display associated with presentation unit 206 of the card device 106, etc.) that the user is authenticated, or the card device 106 may only be active (or otherwise available for use) following such authentication.

In view of the above, the systems and methods herein permit a biometric image to be stored in a memory of a card device, and in particular, a contactless payment card. The biometric image template is stored through a secure exchange between the card device and a communication device, to limit and/or reduce any potential of storing a biometric image not associated with the user to which the card device is issued and/or associated. In this manner, the biometric image may be provisioned to the card device apart from the inconvenient and/or onerous interactions with an issuer of the card device (e.g., without a visit by the user to a baking location, or a specific biometric provisioning location, etc. in order to provision the biometric image to the card device). Rather, the systems and methods herein leverage the communication device of the user, in combination with a certified mobile application (and its wireless communication capability with the card device), to provision the biometric image template, thereby providing an efficient process which is different than conventional techniques used in storing biometrics in card devices, and specifically, payment cards. As such, a new manner of provisioning biometric templates to card devices is provided. And, in connection therewith, generic card devices may be originally provided to the users without biometrics already provisioned thereto, providing an increased efficiency in such interactions to ultimately provision the biometric templates to the card devices.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) authenticating, by a card device, a portable communication device, based on a certificate associated with the portable communication device; (b) receiving, at the card device, via a wireless connection between the portable communication device and the card device, a biometric image of a user from the portable communication device (e.g., when the communication device is authenticated or prior thereto, etc.); (c) storing, by the card device, the biometric image of the user in a memory of the card device as a biometric image template (e.g., when the communication device is authenticated, etc.), whereby the user may be authenticated, by the card device, based on a subsequent biometric image matching the biometric image template; (d) receiving the certificate associated with the portable communication device, from the communication device, via the wireless connection between the portable communication device and the card device; (e) receiving, at the card device, the subsequent biometric image; (f) comparing, by the card device, the subsequent biometric image to the biometric image template; (g) transmitting, from the card device, an indicator of a result of comparing the subsequent biometric image to the biometric image template, thereby indicating whether the user is authenticated; and (f) transmitting, to the communication device, a certificate associated with the card device, whereby the communication device is able to authenticate the card device based on the transmitted certificate (e.g., whereby the card device receives the biometric image of the user only after both the communication device and the card device are authenticated, whereby the card device stores the biometric image of the user in the memory of the card device as the biometric image template only after both the communication device and the card device are authenticated, etc.).

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable communication device for use in provisioning a biometric image template to a payment card device for use in authenticating a user associated with the payment card device, the portable communication device comprising:
    at least one processor;
    a wireless communication interface coupled to the at least one processor; and
    at least one input device coupled to the at least one processor;
    wherein the at least one processor comprises executable instructions that, when executed by the at least one processor, cause the at least one processor to:
        transmit to a payment card device, via the wireless communication interface, a certificate associated with the portable communication device, whereby the portable communication device is authenticated by the payment card device;
        receive from the payment card device, via the wireless communication interface, a certificate associated with the payment card device;
        authenticate the payment card device based on the received certificate; and
        in response to the payment card device being authenticated, based on the received certificate:
            prompt the user to position the at least one input device to capture a biometric image of the user, the biometric image of the user being an image of a face of the user;
            capture, via the at least one input device, the biometric image of the user; and
            provision, via the wireless communication interface, the captured biometric image to the payment card device, whereby the payment card device stores the captured biometric image, based on the payment card device authenticating the portable communication device based on the transmitted certificate associated with the portable communication device.

2. The portable communication device of claim 1, wherein the wireless communication interface includes a radio-frequency identification (RFID) communication interface.

3. The portable communication device of claim 1, wherein the at least one input device includes a camera input device; and
    wherein the biometric image of the user includes a facial image of the user.

4. The portable communication device of claim 3, wherein the executable instructions, when executed by the at least one processor, further cause the at least one processor, prior to transmitting the certificate to the payment card device, to: poll a vicinity of the portable communication device for near-field communication enabled (NFC-enabled) devices; and detect the payment card device as at least one of the NFC-enable devices in the vicinity.

5. The portable communication device of claim 1, wherein the certificate associated with the payment card device is a X.509 formatted certificate.

6. The portable communication device of claim 1, wherein the executable instructions, when executed by the at least one processor, cause the at least one processor, in connection with provisioning the captured biometric image to the payment card device, to: transmit the captured biometric image to the payment card device, whereby the payment card device stores the biometric image as a biometric template in a memory of the payment card device.

7. The portable communication device of claim 1, wherein the executable instructions, when executed by the at least one processor, further cause the at least one processor to: prompt the user to present a second biometric; capture, via the at least one input device, a second biometric of the user; and prior to provisioning the captured biometric image of the user to the payment card device, authenticate the user to the portable communication device based on the captured second biometric.

8. The portable communication device of claim 7, wherein the at least one input device includes a fingerprint scanner; and wherein the second biometric includes a fingerprint of the user.

9. The portable communication device of claim 1, wherein the executable instructions, when executed by the at least one processor, cause the at least one processor, in order to authenticate the certificate associated with the payment card device, to verify a signature of the certificate based on a public key extracted from the certificate associated with the payment card device.

10. A computer-implemented method for use in provisioning a biometric image template to a payment card device, the method comprising:

transmitting, by a portable communication device, to a payment card device, via a wireless communication interface, a certificate associated with the portable communication device, whereby the portable communication device is authenticated by the payment card device based on the certificate associated with the portable communication device;

receiving, by the portable communication device, from the payment card device, via the wireless communication interface, a certificate associated with the payment card device;

authenticating, by the portable communication device, the payment card device based on the received certificate associated with the payment card device; and in response to the payment card device being authenticated based on the received certificate:

prompting a user to position at least one input device of the portable communication device to capture a biometric image of the user, the biometric image of the user being an image of a face of the user;

capturing, by the at least one input device of the portable communication device, a biometric image of the user; and transmitting, via the wireless communication interface, the captured biometric image to the payment card device whereby the payment card device stores the biometric image as a biometric template, based on the payment card device authenticating the portable communication device based on the transmitted certificate associated with the portable communication device.

11. The computer-implemented method of claim 10, further comprising, prior to transmitting the captured biometric to the payment card device: prompting the user to present a second biometric; capturing, via the at least one input device, a second biometric of the user; and authenticating the user to the portable communication device based on the captured second biometric.

12. The computer-implemented method of claim 11, wherein the biometric image of the user includes a facial image of the user; and wherein the second biometric includes a fingerprint of the user.

13. The computer-implemented method of claim 10, further comprising, prior to transmitting the certificate to the payment card device, to: polling, by the portable communication device, for near-field communication enabled (NFC-enabled) devices within a vicinity of the portable communication device; and detecting, by the portable communication device, the payment card device as at least one of the NFC-enable devices.

14. The computer-implemented method of claim 13, further comprising receiving, via a touch sensitive panel of the portable communication device, an input from the user to provision the biometric to the payment card device, prior to polling the vicinity of the portable communication device for NFC-enabled devices and prior to transmitting the certificate associated with the portable communication device.

15. The computer-implemented method of claim 10, wherein authenticating the certificate associated with the payment card device includes validating a signature of the certificate associated with the payment card device.

16. The computer-implemented method of claim 15, wherein the certificate associated with the payment card device includes a X.509 formatted certificate.

17. The computer-implemented method of claim 10, wherein the wireless communication interface includes a radio-frequency (RF) adapter of the portable communication device.

* * * * *